Patented May 9, 1950

2,507,414

UNITED STATES PATENT OFFICE 2,507,414

ORGANO-SILICON RESINS AND PROCESS FOR MAKING SAME

Charles A. MacKenzie, East Orange, N. J., assignor, by direct and mesne assignments, of one-half to Montclair Research Corporation, a corporation of New Jersey, and one-half to Ellis-Foster Company, a corporation of New Jersey No Drawing. Application January 17, 1946, Serial No. 641,879

32 Claims. (Cl. 260—46.5)

This invention relates to the production of resinous materials from organo silicon derivatives, particularly to lacquers containing such products, to methods of making such products and to their utilization.

Among the objects of the present invention is the production of resinous materials from organo silicon derivatives.

Other objects include the production of lacquers and coating compositions from such organo silicon derivatives, and their utilization in the production of films on articles of manufacture, which films exhibit outstanding properties.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, resinous materials are produced from aryl silicon derivatives, particularly what may be designated as aryl silicochloroform derivatives. It has been found that such derivatives may be subjected to hydrolysis and the hydrolytic products then aerated by treatment with oxygen or air at elevated temperatures to produce materials which are still soluble and can be utilized very desirably in the production of films deposited from coating compositions on articles of manufacture. Such derivatives have been found to have outstanding properties from the standpoint of heat resistance.

The aryl silicochloroform derivatives thus utilized may be characterized by the presence of a hydrogen-silicon bond in the molecule and may be generally formulated as $R_ySiHX_{3-y}$, where R is an aryl, alkaryl or aralkyl group or other similar carbocyclic group, X is a halogen particularly selected from chlorine, bromine and iodine, and y is 1 or 2. Compounds of this type are utilized because they are hydrolyzable, and on hydrolysis, the halogen group is removed and replaced by a hydroxyl group, or oxide groups, or mixtures thereof, and of course, under some circumstances there may be partial polymerization. The invention will be particularly illustrated by the silicochloroform derivatives and particularly such compounds as $RSiHCl_2$ or $RR'SiHCl$, where R and R' are aryl, alkaryl, aralkyl, etc., as set forth above. Any hydrolyzable compounds of the character referred to above may be utilized in carrying out the present invention.

It may be well to point out that in connection with nomeclature, these derivatives are characterized as silicochloroform derivatives. Of course, the comparable nomeclature based on the silane group may be used. As exemplary of such compounds that may be utilized in the present invention there may be mentioned monophenyl dichlorosilane, diphenyl monochlorosilane, monobenzyl dichlorosilane, and dibenzyl monochlorosilane.

The organo silicochloroform derivatives or mixtures containing the same which are employed in accordance with the present invention may be prepared by any desirable methods. They may be for example, produced by reacting the desired Grignard reagent containing the aryl group or other carbocyclic group, with the silicon halide. Or they may be made in one step reactions in which the silicon halide and desired aryl or other carbocyclic halide are reacted together in the presence of metallic magnesium, desirably under temperature conditions where there is refluxing, particularly when a solvent such as a Grignard solvent is present. Any of such carbocyclic silicochloroform derivatives may be utilized in accordance with the present invention. They are subjected to hydrolysis by any convenient means to remove the halogen such as chlorine either in whole or in part and to substitute hydroxyl groups or the oxide groups or mixtures of such derivatives in various combinations in connection with which there may also be partial polymerization depending on the conditions under which the reaction is carried out. The hydrolysis step employed involves subjecting the silicochloroform derivative or mixtures containing it as set forth above, generally in ether or other solution by pouring such silicochloroform derivative or mixtures containing it or mixtures of such derivatives on ice, the water separated from the hydrolyzed product and the latter dried. Such procedure is merely exemplary of the hydrolysis step that can be employed to produce the hydrolyzed silicochloroform derivative or composition containing such hydrolyzed derivative.

In accordance with the present invention, the hydrolyzed materials are subjected to heat and to blowing with air, desirably the heat treatment and blowing with air being carried out simultaneously to aid in the resinification. At this stage the resinification may be carried to a point where an extremely viscous liquid or gel-like solid is obtained.

The temperatures employed in the blowing operation and the length of time treatment involved may be adjusted depending on the materials undergoing treatment and the nature of the products sought. The range of temperatures employed in aeration will generally run from about 100 to 300° C., and the time will vary from periods of a few minutes to several hours. This will all be illustrated below in the examples which will show heat treatments from a few minutes to periods of several hours. For example, two hours or more at 250° C. are required generally for the aeration of strictly aryl derivatives. The aeration time can be shortened and the aeration temperature lowered by utilization of mixtures containing the aryl derivatives and alkyl derivatives or silicochloroform per se or silicon tetrachloride or similar halides. The materials are utilized desirably in soluble form, in solution in desired solvents, and applied as coating compositions from which the desired film is obtained. The films produced from the strictly aryl derivatives are more heat resistant than those containing other mixtures with stated materials which will be illustrated below. By proper blending it is apparent that a large series of varnish resins varying very considerably in their properties, may be made by the utilization of mixtures of various materials as will be further emphasized below. Generally, when the aeration time is shorter and the temperature lower, the curing time employed in treating the deposited film is shorter and the lower temperature usually employed to avoid cracking of the films. In such aeration treatments, the temperature treatment and length of time treatment will vary with the particular types of derivatives undergoing resinification as well as the degree to which such reaction is to be carried.

Such blowing operation need not be carried out at a single range of temperature but successive stages of temperature treatment varying between such stages may be employed for varying periods at different temperatures, as for example, where the blowing operation is carried out in several steps with different temperatures employed in the several steps desirably utilizing higher temperatures in the later stages of treatment and there may be two or more such stages of different temperature treatments depending on the nature of the product undergoing treatment, and the ultimate resinification product sought. Similarly the time treatment where multi-temperature stage processes are employed may vary depending on the characteristics and the product sought from the particular material undergoing treatment.

In the modification of the stated aerated, hydrolyzed aryl or other carbocyclic silicochloroform derivatives, various other organo silicon compounds may be included to modify the properties desirably as indicated above. Thus mixtures of any of the stated aryl or other carbocyclic silicochloroform derivatives with various hydrolyzed alkyl derivatives of either silicochloroform or of silicon tetrachloride or other similar silicon halides may be employed.

Or mixtures of the aryl or aralkyl, i e., phenyl and benzyl derivatives of silicochloroform may be employed with phenyl and benzyl or other aryl, aralkyl, alkaryl, or carbocyclic derivatives of silicon tetrachloride either with out without the alkyl derivatives of the silicochloroform and the alkyl derivatives of silicon tetrachloride as set forth immediately above.

Any of these mixtures of materials may be utilized in a variety of ways. Each of the products may be separately treated by aeration of the hydrolyzed halogen derivatives and the aerated and hydrolyzed derivatives then intermixed and utilized in solution for the production of lacquers or other coating compositions. Or the several derivatives specified above in any of the mixtures, may be hydrolyzed separately, then mixed together and subjected to the aeration. Or the various mixtures as set forth above may be utilized in the form of mixed halides which are subjected to cohydrolysis followed by aeration of the cohydrolyzed products. Furthermore, any of these cohydrolysis mixtures of any of the stated ingredients may be produced also with the addition of silicon tetrachloride or silicochloroform or both of them and any combination of these various ingredients may be utilized in the manner set forth above in producing various combinations and a variety of these will be illustrated below.

By the utilization of alkyl derivatives of silicochloroform, alkyl derivatives of silicon tetrachloride, aryl or aralkyl or other carbocyclic derivatives of silicon tetrachloride, such as phenyl and benzyl derivatives of silicon tetrachloride, as well as of silicon tetrachloride and silicochloroform themselves, with the aryl silicochloroform derivatives, control of the ultimate properties of the materials may be utilized and any combination of these various materials may be utilized either in cohydrolysis mixtures which are aerated or in aerated individual hydrolyzed materials which are subsequently mixed, or in the aeration of mixed hydrolysis products as set forth above.

The materials produced in accordance with the present invention are particularly important in their utilization in the production of coating compositions from which desirable films are deposited on articles of manufacture, such films exhibiting marked heat resistance and the characteristics may as indicated be controlled by proper blending with any of the stated materials to produce a variety of varnish resins that may be utilized for particular purposes in any of these ways.

The solutions of the soluble materials produced in the initial aeration stage are employed as indicated as coating compositions to deposit lacquer-type films which are then subjected to curing operations. The curing operations may desirably be carried out at temperatures from 150° C. to 300° C., depending on the nature of the materials undergoing such curing and at time periods varying from a few minutes, as for example, five minutes to several hours, for example, six hours.

The particular derivative diphenyl monochlorosilane is particularly valuable in the production of such films by methods in accordance with the present invention, either utilized per se preferably, or in combination with other stated ingredients as set forth above.

The solvents employed may vary depending on the particular materials utilized. As exemplary of solvents that may be employed there may be mentioned solvents such as benzene, toluene, xylene, butanol, ether, ethyl acetate, etc., depending on the solubility of the characteristics of the materials employed, and of course, balanced solvents including mixtures of materials may be utilized for any particular purpose.

Various fillers may be incorporated into the composition as well as any of the desired adjuvants. Among fillers that may be utilized there may be mentioned zinc oxide, carbon black, titanium oxide, magnesia, alumina, magnesium carbonate and the like, or combinations thereof.

The film hardening may be catalyzed by the use of drier materials such as the naphthenates like lead, cobalt, etc. More desirable effects are produced by incorporating the drier such as the naphthenate with the particular material after aeration.

The characteristics of the material ultimately produced depends on whether aryl derivatives per se are employed in producing the final materials, or whether mixed materials are employed, particularly mixed alkyl and aryl derivatives. Where more than one organic substituent is present in the organo silicon derivatives, one such substituent may be the aryl, aralkyl, alkaryl, or other carbocyclic group, while the other is selected from alkyl or other aliphatic and unsaturated groups including for example, alkyl, alphyl, aryl, alkynyl, alkenyl, aralkyl, alkanyl, olefinyl, non-aromatic carbocyclic groups and the like, illustrated by methyl, ethyl, propyl, butyl, amyl, hexyl, hetyl, octyl, vinyl, allyl, butenyl, cyclohexyl, benzyl, phenyl, tolyl, xenyl, chlorphenyl, styryl, radicals from acetylene, methyl acetylene, propyl acetylene, phenyl acetylene, and the like.

In the aeration treatment, as the oxidizing agent, dry air is preferable but pure oxygen or oxygen mixed with various inert gases, or ozone, either their utilization with or without oxidizing agents such as benzoyl peroxide, acetyl peroxide and the like may be employed. The oxidation may be carried out solely by bubbling air through the desired derivative or catalysts may be present, such catalysts for example, as vanadium pentoxide, tin vanadate, and the like. No catalysts are, however, essential in carrying out the reaction in the aeration step as illustrated in the examples set forth below.

The following examples illustrate the invention, parts being by weight unless otherwise indicated.

I

The first example describes the polymerization of hydrolyzed ethyl dichlorosilane by means of heat and air.

A stream of air was passed through hydrolyzed mono-ethyl dichlorosilane for 2½ hours at 155–160° C. The very viscous material thus obtained was dissolved in an equal weight of toluene. A film was poured on a glass plate. When the film was heated at 150–160° C. for five hours a clear, hard product was obtained.

II

The next example describes the polymerization of hydrolyzed mono-butyl dichlorosilane.

Hydrolyzed mono-butyl dichlorosilane was aerated at 155–160° C. for 2¼ hours. The viscous product obtained was dissolved in an equal weight of toluene. A film was poured on a glass plate and heated at 180° C. for six hours. A clear, hard film was obtained.

III

The next example describes the polymerization of a mixture of the hydrolytic products of mono-methyl dichlorosilane and mono-butyl dichlorosilane.

Equal parts each of hydrolyzed mono-methyl dichlorosilane and hydrolyzed mono-butyl dichlorosilane were mixed and aerated at 160° C. for one hour. The resulting product was dissolved in toluene (40% toluene by weight) and a film was poured on a glass plate. A clear, hard film was obtained when the plate was heated to 150° C. for six hours.

IV

The next example describes the polymerization of hydrolyzed mono-phenyl dichlorosilane.

Hydrolyzed mono-phenyl dichlorosilane was aerated at 250° C. for 30 minutes. The resulting viscous product was dissolved in toluene (30% toluene by weight). A film of the resin was put on a glass plate and baked at 270° C. for 1½ hours. A clear, hard film was obtained.

V

The next example describes the polymerization of hydrolyzed diphenyl monochlorosilane.

Hydrolyzed diphenyl monochlorosilane was placed in a 3-neck flask equipped with a stirrer. The stirred sample was aerated for seven hours at 270° C. The very viscous material obtained by this treatment was dissolved in toluene (30% by weight of toluene) to give a solution with a viscosity of 1.25 poises at 25° C.

Films of the resin were placed on glass plates and heated at the various times and temperatures listed below:

| Plate Number | Time of Heating | Temperature, °C. |
|---|---|---|
| 1 | ½ hour | 270 |
| 2 | 1 hour | 270 |
| 3 | 3 hours | 270 |
| 4 | 20 min | 300 |
| 5 | 5 min | 300 |

All the films, with the exception of the last one, were hard. The five minute treatment gave a tack-free but soft film.

VI

The next example describes the polymerization of a mixture of hydrolyzed diphenyl monochlorosilane and hydrolyzed mono-phenyl dichlorosilane.

Equal parts each of hydrolyzed diphenyl monochlorosilane and hydrolyzed mono-phenyl dichlorosilane were mixed and the mixture was aerated at 270° C. for 90 minutes. The viscous product obtained was dissolved in toluene (30% by weight of toluene). A film of the resin was put on a glass plate and heated as follows: two hours at 250° C. gave a tack-free but soft film; and additional 30 minutes at 270° C. gave a clear, hard film.

VII

The next example describes the polymerization of a cohydrolyzed mixture of mono-phenyl dichlorosilane and diphenyl monochlorosilane.

An equal mixture of diphenyl monochlorosilane and mono-phenyl dichlorosilane was hydrolyzed and a portion of the resulting product was aerated at 270° C. for 90 minutes. The viscous material obtained was dissolved in toluene. A film placed on glass cured to a hard clear state when it was heated 45 minutes at 270° C.

VIII

The next example describes the polymerization of hydrolyzed ditolyl monochlorosilane.

Hydrolyzed ditolyl monochlorosilane was aerated for 2 hours at 270° C. The viscous product obtained was dissolved in toluene. A film, placed on a glass plate, cured to a hard, clear state when it was heated for 70 minutes at 270° C.

IX

The next example describes the polymerization of a mixture of hydrolyzed diphenyl monochlorosilane and hydrolyzed mono-benzyl dichlorosilane.

A mixture of hydrolyzed diphenyl monochlorosilane and hydrolyzed mono-benzyl dichlorosilane (weight ratio 3:1) was aerated at 270° C. for 35 minutes. The viscous product was dissolved in toluene and a film was placed on a glass plate. A clear, hard product was obtained when the film was heated at 210° C. for 2 hours.

X

The next example describes the polymerization of a mixture of hydrolyzed diphenyl monochlorosilane and hydrolyzed dibenzyl monochlorosilane.

A mixture of hydrolyzed diphenyl monochlorosilane and hydrolyzed dibenzyl monochlorosilane (weight ratio 3:1) was aerated at 270° C. for 90 minutes. The viscous product obtained was dissolved in toluene and a film was poured on a glass plate. A clear, hard film was obtained when the plate was heated at 220° C. for 2 hours.

XI

The next example describes the polymerization of hydrolyzed phenylbutyl monochlorosilane.

Hydrolyzed phenylbutyl monochlorosilane was aerated at 270° C. for 30 minutes. The aerated product was dissolved in toluene and a film was poured on a glass plate. A clear, hard product was obtained when the film was heated at 260° C. for 35 minutes.

XII

The next example describes the polymerization of a product obtained by the hydrolysis of a mixture of diphenyl monochlorosilane and mono-butyl dichlorosilane.

A mixture of equal parts by weight of diphenyl dichlorosilane and mono-butyl dichlorosilane was hydrolzed. The resulting product was aerated at 270° C. for 45 minutes. The viscous product obtained was dissolved in toluene and a film was poured on a glass plate. A clear, hard film was obtained when the plate was heated at 270° C. for 40 minutes.

XIII

The next example describes the polymerization of a product obtained by the hydrolysis of a mixture of mono-phenyl dichlorosilane and butyl silicon trichloride.

A mixture of mono-phenyl dichlorosilane and butyl silicon trichloride (weight ratio of 5:3) was hydrolyzed and the resulting product was aerated at 160° C. At this temperature the product gelled in 10 minutes.

Hydrolyzed mono-phenyl dichlorosilane and hydrolyzed butyl silicon trichloride when aerated alone at 160° C. require heating periods considerably in excess of 10 minutes.

XIV

The next example describes the polymerization of a product obtained by hydrolyzing a mixture of diphenyl mono-chlorosilane and diethyl silicochloroform.

A mixture of diphenyl monochlorosilane and diethyl monochlorosilane (weight ratio 1:1) was hydrolyzed. The product was aerated at 270° C. for 60 minutes. The viscous material obtained was dissolved in toluene and a film was poured on a glass plate. When the plate was heated at 250° C. for one hour a clear, hard film was obtained.

XV

The next example describes the polymerization of a product obtained from the hydrolysis of a mixture of diphenyl monochlorosilane and silicochloroform.

A mixture of diphenyl monochlorosilane and silicochloroform (weight ratio 1:1) was hydrolyzed. Some solid precipitated from the ether solution and was removed. After removal of the ether, the resulting product was aerated for 35 minutes at 270° C. The product was dissolved in toluene (30% by weight of toluene) and a film was poured on a glass plate. When the plate was heated at 270° C. for one hour a hard film was obtained.

XVI

The next example describes the polymerization of a product obtained from the hydrolysis of a mixture of diphenyl monochlorosilane and silicon tetrachloride.

A mixture of diphenyl monochlorosilane and silicon tetrachloride (weight ratio 1:1) was hydrolyzed. Some solid precipitated from the ether solution and was removed. After removal of the ether, the resulting product was aerated at 270° C. for 35 minutes. The product was dissolved in toluene (30% by weight of toluene) and a film was poured on a glass plate. When the plate was heated at 270° C. for one hour a hard film was obtained.

XVII

The next two examples show the effect of a catalyst in the curing of a silicone resin film.

The product resulting from aeration as described in Example XIV was dissolved in toluene (50% by weight) and to the solution was added lead naphthenate ("Nuodex" lead naphthenate containing 24% lead) in the ratio of 4:0.25 of product to naphthenate. A film of the mixture was poured on a glass plate. When the plate was heated for 20 minutes at 150° C. a clear, hard, brittle film was obtained. In the absence of the lead naphthenate the same heating conditions produced only a soft film.

XVIII

To hydrolyzed diphenyl monochlorosilane (dissolved in toluene to give a 65% solids content) was added lead naphthenate in the ratio of 3.1:0.25 by weight. A film of the mixture was poured on a glass plate. When the plate was heated at 150° C. for 20 minutes a clear, hard, somewhat brittle film was obtained. In the absence of the lead naphthenate the same heating conditions produced a soft film.

Having thus set forth my invention, I claim:

1. The method of preparing resinous materials which comprises hydrolyzing by water alone, the halogen only of a silicochloroform derivative containing a silicon-hydrogen bond having the formula $R_ySiHX_{3-y}$ where R is a monovalent carbocyclic radical, X is halogen selected from the group consisting of chlorine, bromine and iodine, and $y$ is an integer of from 1 to 2 and heating the hydrolyzed product while blowing air therethrough at a temperature of from 100 to 300° C. until a resinous material is obtained.

2. The method of preparing resinous materials which comprises heating a halogen-only hydrolyzed aryl silicochloroform derivative containing a silicon-hydrogen bond having the formula $R_y SiHX_{3-y}$ where R is a monovalent carbocyclic radical, X is halogen selected from the group consisting of chlorine, bromine and iodine, and $y$ is an integer of from 1 to 2 while blowing air therethrough at a temperature of from 100 to 300° C. until a resinous material is obtained.

3. The method of preparing resinous materials which comprises heating a halogen-only hydrolyzed diphenyl monochlorosilane containing a silicon-hydrogen bond while blowing air therethrough at a temperature of from 100 to 300° C. until a resinous material is obtained.

4. An article of manufacture carrying a film of a coating composition containing a soluble, aerated halogen-only hydrolyzed product of a silicochloroform derivative containing a silicon-hydrogen bond having the formula $R_y SiHX_{3-y}$ where R is a monovalent carbocyclic radical, X is halogen selected from the group consisting of chlorine, bromine and iodine, and $y$ is an integer of from 1 to 2 and a volatile liquid organic solvent therefor, the aerated silicon derivative being prepared by the method of claim 2.

5. An article of manufacture as set forth in claim 4 in which R is aryl.

6. An article of manufacture as set forth in claim 4 in which the silicochloroform derivative is monophenyldichlorosilane.

7. An article of manufacture as set forth in claim 4 in which the silicochloroform derivative is diphenylmonochlorosilane.

8. An article of manufacture as set forth in claim 4 in which the silicochloroform derivative is monobenzyl dichlorosilane.

9. The method of preparing resinous materials which comprises hydrolyzing diphenyl monochlorosilane by ice, separating the hydrolyzed derivative and blowing air therethrough at a temperature of 100–300° C. until a resinous material is obtained.

10. A coating composition containing a soluble, aerated halogen-only hydrolyzed product of a silicochloroform derivative containing a silicon-hydrogen bond having the formula $R_y SiHX_{3-y}$ where R is a monovalent carbocyclic radical, X is halogen selected from the group consisting of chlorine, bromine and iodine, and $y$ is an integer of from 1 to 2 and a volatile liquid organic solvent therefor, the aerated silicon derivative being prepared by the method of claim 2.

11. A coating composition as set forth in claim 10 in which R is aryl.

12. A coating composition containing a soluble, aerated halogen-only hydrolyzed monophenyl dichlorosilane prepared by the method of claim 2 and a volatile liquid organic solvent therefor.

13. A composition containing an aerated, halogen-only hydrolyzed diphenyl monochlorosilane prepared by the method of claim 2.

14. A composition containing an aerated, halogen-only hydrolyzed monobenzyl dichlorosilane prepared by the method of claim 2.

15. A composition containing an aerated halogen-only hydrolyzed product of a silicochloroform derivative containing a silicon-hydrogen bond having the formula $R_y SiHX_{3-y}$ where R is a monovalent carbocyclic radical, X is halogen selected from the group consisting of chlorine, bromine and iodine, and $y$ is an integer of from 1 to 2, the aerated silicon derivative being prepared by the method of claim 2.

16. A composition containing an aerated halogen-only cohydrolyzed mixture of a silicochloroform derivative containing a silicon-hydrogen bond having the formula $R_y SiHX_{3-y}$ where R is a monovalent carbocyclic radical, X is halogen selected from the group consisting of chlorine, bromine and iodine, and $y$ is an integer of from 1 to 2 and silicochloroform prepared by the method of claim 2.

17. A composition containing aerated halogen-only hydrolyzed products of two different silicochloroform derivatives containing a silicon-hydrogen bond each having the formula $R_y SiHX_{3-y}$ where R is a monovalent carbocyclic radical, X is halogen selected from the group consisting of chlorine, bromine and iodine, and $y$ is an integer of from 1 to 2, made by the method of claim 2.

18. A composition as set forth in claim 17 in which the derivatives are a diarylmonochlorosilane and a monoaryldichlorosilane.

19. A composition as set forth in claim 18 in which the derivatives are monophenyl dichlorsilane and diphenylmonochlorsilane.

20. A composition as set forth in claim 18 in which the derivatives are diphenylmonochlorsilane and monobenzyldichlorsilane.

21. A composition containing aerated halogen-only hydrolyzed products of two different silicochloroform derivatives containing a silicon-hydrogen bond each having the formula $R_y SiHX_{3-y}$ where X is halogen selected from the group consisting of chlorine, bromine, and iodine, and $y$ is an integer of from 1 to 2, in one derivative R being a monovalent carbocyclic group and in the other derivative R being alkyl, made by the method of claim 2.

22. A composition as set forth in claim 21 in which the derivatives are a diarylmonochlorsilane and a monoalkyldichlorsilane.

23. A composition as set forth in claim 21 in which the derivatives are diphenylmonochlorsilane and monobutyldichlorsilane.

24. A composition as set forth in claim 21 in which the derivatives are a diarylmonochlorsilane and a dialkylmonochlorsilane.

25. A composition as set forth in claim 21 in which the derivatives are diphenylmonochlorsilane and diethylmonochlorsilane.

26. The method of claim 2 in which halogen-only hydrolyzed products of two different carbocyclic derivatives of the stated formula are heated.

27. The method of claim 26 in which the derivatives are a diarylmonochlorsilane and a monoaryldichlorosilane.

28. The method of claim 2 which includes heating the stated carbocyclic derivative with a halogen-only hydrolyzed product of a silicochloroform derivative having the formula $R_y SiHX_{3-y}$ where R is alkyl and X and $y$ have the values set forth in claim 2.

29. The method of claim 28 in which the derivatives are a diarylmonochlorsilane and a monoalkyldichlorosilane.

30. The method of claim 28 in which the derivatives are diphenylmonochlorosilane and monobutyldichlorosilane.

31. The method of claim 28 in which the derivatives are a diarylmonochlorsilane and a dialkylmonochlorsilane.

32. The method of claim 28 in which the derivatives are diphenylmonochlorsilane and diethylmonochlorsilane.

CHARLES A. MacKENZIE.

(References on following page)

REFERENCES CITED

The following references are of record in the file of this patent:

UNITED STATES PATENTS

| Number | Name | Date |
|---|---|---|
| 2,371,050 | Hyde | Mar. 6, 1945 |
| 2,377,689 | Hyde | June 5, 1945 |
| 2,386,259 | Norton | Oct. 9, 1945 |
| 2,386,466 | Hyde | Oct. 9, 1945 |
| 2,386,467 | Hyde | Oct. 9, 1945 |
| 2,397,727 | Daudt | Apr. 2, 1946 |
| 2,435,147 | McGregor et al. | Jan. 27, 1948 |

OTHER REFERENCES

Stock et al.: Berichte Deut. Chem. Gesel, vol. 52, 1919, pages 695 to 699, 708, 713, 722, and 733.

Chemical and Engineering News, vol. 24, May 10, 1946, pages 1233 and 1234.